(12) United States Patent
Marte et al.

(10) Patent No.: US 9,234,686 B2
(45) Date of Patent: Jan. 12, 2016

(54) USER CONTROL INTERFACE FOR HEAT TRANSFER SYSTEM

(71) Applicant: Energy Recovery Systems Inc., Coquitlam (CA)

(72) Inventors: Sean Douglas Marte, Langley (CA); Thomas King Fu Leung, Richmond (CA)

(73) Assignee: ENERGY RECOVERY SYSTEMS INC., Coquitlam, BC (CA)

(*) Notice: Subject to any disclaimer, the term of this patent is extended or adjusted under 35 U.S.C. 154(b) by 355 days.

(21) Appl. No.: 13/837,474

(22) Filed: Mar. 15, 2013

(65) Prior Publication Data

US 2014/0260381 A1    Sep. 18, 2014

(51) Int. Cl.
*F25B 49/02* (2006.01)
*F25B 40/02* (2006.01)
(Continued)

(52) U.S. Cl.
CPC  *F25B 49/02* (2013.01); *F24H 4/02* (2013.01); *F24H 9/2028* (2013.01); *F25B 40/02* (2013.01); *F24D 2200/31* (2013.01); *F25B 2339/047* (2013.01); *F25B 2600/2513* (2013.01); *F25B 2700/1931* (2013.01);
(Continued)

(58) Field of Classification Search
CPC .. F25B 49/02; F25B 40/02; F25B 2700/1931; F25B 2700/1933; F25B 2700/21151; F25B 2700/21152; F25B 2399/047; F25B 2341/064; F25B 2600/2513; F24H 4/02; F24H 9/2028; F24D 2200/31; Y02B 30/52
USPC ........................................ 62/222, 225, 228.1
See application file for complete search history.

(56) References Cited

U.S. PATENT DOCUMENTS 4,141,222 A    2/1979  Ritchie
4,265,094 A    5/1981  Haasis, Jr.
(Continued)

FOREIGN PATENT DOCUMENTS

CA    2229355 C    2/1999
CA    2574996 A1   12/2006
(Continued)

OTHER PUBLICATIONS

Carlyle Compressor—Smart Unloading Controller Application Guide; Dec. 22, 2011.
(Continued)

*Primary Examiner* — Marc Norman
(74) *Attorney, Agent, or Firm* — Perry + Currier, Inc.

(57) ABSTRACT

A controller can be connected to a heat transfer system including pressure and temperature sensors, an electrically controlled valve, and a compressor. The controller can be configured to control the heat transfer system according to compressor suction superheat, compressor discharge superheat, compressor suction pressure, compressor discharge pressure, and temperature of water received at a condenser to be heated by waste-heat bearing fluid in an evaporator. The controller can include a touchscreen configured to display a user control interface configured to display views based on a permissions database defining different types of users. The views can include different views having different input fields, output fields, and output graphs. The permissions database can permit input of control loop parameters by one of the different types of users and prevent input of control loop parameters by another of the different types of users.

14 Claims, 14 Drawing Sheets

(51) Int. Cl.
*F24H 4/02* (2006.01)
*F24H 9/20* (2006.01)

(52) U.S. Cl.
CPC .................. *F25B 2700/1933* (2013.01); *F25B 2700/21151* (2013.01); *F25B 2700/21152* (2013.01); *Y02B 30/52* (2013.01)

(56) References Cited

U.S. PATENT DOCUMENTS

| | | | |
|---|---|---|---|
| 4,320,630 | A | 3/1982 | Uselton et al. |
| 4,330,309 | A | 5/1982 | Robinson, Jr. |
| 4,416,222 | A | 11/1983 | Staats |
| 4,431,390 | A | 2/1984 | Hart |
| 4,685,307 | A | 8/1987 | Jones |
| 4,972,683 | A | 11/1990 | Beatenbough |
| 5,050,394 | A | 9/1991 | Dudley et al. |
| 5,115,644 | A | 5/1992 | Alsenz |
| 5,305,614 | A | 4/1994 | Gilles |
| 5,575,159 | A | 11/1996 | Dittell |
| 5,622,057 | A | 4/1997 | Bussjager et al. |
| 5,758,820 | A | 6/1998 | Celorier, Jr. et al. |
| 5,806,331 | A | 9/1998 | Brown |
| 5,906,104 | A | 5/1999 | Schwartz et al. |
| 6,381,970 | B1 | 5/2002 | Eber et al. |
| 6,711,911 | B1 * | 3/2004 | Grabon et al. .................. 62/225 |
| 7,334,419 | B2 | 2/2008 | Gordon et al. |
| 7,644,591 | B2 | 1/2010 | Singh et al. |
| 7,845,179 | B2 | 12/2010 | Singh et al. |
| 7,908,881 | B2 | 3/2011 | Kopko |
| 8,250,879 | B2 | 8/2012 | MacBain et al. |
| 2001/0039809 | A1 | 11/2001 | Wada et al. |
| 2003/0077179 | A1 | 4/2003 | Collins et al. |
| 2008/0196871 | A1 | 8/2008 | Lavanchy et al. |
| 2008/0245087 | A1 * | 10/2008 | Orcutt .......................... 62/238.7 |
| 2008/0296396 | A1 | 12/2008 | Corroy et al. |
| 2009/0232663 | A1 | 9/2009 | Mirsky et al. |
| 2009/0274342 | A1 * | 11/2009 | Wu et al. ........................ 382/112 |
| 2010/0193152 | A1 | 8/2010 | Singleton, Jr. et al. |
| 2011/0132007 | A1 | 6/2011 | Weyna et al. |
| 2011/0209485 | A1 | 9/2011 | Lifson et al. |
| 2011/0304466 | A1 * | 12/2011 | Bair et al. ..................... 340/585 |
| 2012/0255320 | A1 | 10/2012 | Kawagoe et al. |

FOREIGN PATENT DOCUMENTS

| | | |
|---|---|---|
| CN | 101240949 A | 8/2008 |
| EP | 1801515 A1 | 6/2007 |
| GB | 2052712 A | 1/1981 |
| JP | 8233408 A | 9/1996 |
| JP | 2011058649 A | 3/2011 |
| WO | 2004051148 A1 | 6/2004 |
| WO | 2011127553 A1 | 10/2011 |
| WO | 2011127571 A1 | 10/2011 |
| WO | 2012135933 A2 | 10/2012 |

OTHER PUBLICATIONS

Frick Quantum LX Compressor Control Panel Version 7.0x; Operation (Session Level 2); Service Manual Jun. 2011.
McQuay AirConditioning; Centrifugal Compressor Water Chillers Catalog; CAT WSCWDC-7; Jan. 2009.
PCT International Application No. PCT/CA2010/000605 Search Report dated Jan. 19, 2011.
PCT International Application No. PCT/CA2010/000605 Written Opinion dated Jan. 19, 2011.
PCT International Application No. PCT/CA2010/000605 International Preliminary Report on Patentability dated Sep. 21, 2012.
PCT International Application No. PCT/CA2011/000403 International Search Report dated Jul. 13, 2011.
PCT International Application No. PCT/CA2011/000403 Written Opinion dated Jul. 13, 2011.
PCT International Application No. PCT/CA2011/000403 International Preliminary Report on Patentability dated Sep. 21, 2012.
PCT International Application No. PCT/CA2011/000406 International Search Report dated Dec. 13, 2011.
PCT International Application No. PCT/CA2011/000406 Written Opinion dated Dec. 13, 2011.
PCT International Application No. PCT/CA2011/000406 Second Written Opinion dated May 8, 2013.

\* cited by examiner

USER CONTROL INTERFACE FOR HEAT TRANSFER SYSTEM

FIELD

The present invention relates to heat transfer systems.

BACKGROUND

It is known to employ energy exchange technologies in order to, for example, recover excess heat energy from an air-conditioning system to provide energy to heat water. Many examples of such heat-exchange technologies came about in the early 1980s which reflect the end of the energy crises of the 1970s. It is interesting to note that these heat-exchange technologies have not been generally adopted.

Existing solutions do not provide precise and robust control adequate for heat recovery systems, given that waste-heat recovery typically has large temperature gradients of the kind unforgiving to poor control.

SUMMARY

According to one aspect of the present invention, a heat transfer system includes a compressor for circulating a working fluid. The compressor has an inlet and an outlet. The compressor is operable at a controllable operating capacity. The system further includes a condenser connected to the outlet of the compressor, the condenser configured to receive flow of water to be heated. The system further includes an electrically controlled valve positioned to receive working fluid from the outlet of the condenser, and an evaporator connected between an outlet of the electrically controlled valve and the inlet of the compressor, the evaporator configured to receive flow of waste-heat bearing fluid. The system further includes pressure and temperature sensors positioned to measure pressures and temperatures of the heat transfer system. The system further includes a controller connected to the pressure and temperature sensors, the electrically controlled valve, and the compressor. The controller is configured to control the heat transfer system according to one or more of compressor suction superheat, compressor discharge superheat, compressor suction pressure, compressor discharge pressure, and water temperature. The controller includes a touchscreen configured to display a user control interface configured to display views based on a permissions database defining different types of users.

The views can include different views having different input fields, output fields, and output graphs.

The controller can be configured to require password protected login for at least one of the different types of users.

The permissions database can permit input of control loop parameters by one of the different types of users and prevent input of control loop parameters by another of the different types of users.

The different types of users can include an operator user type, a superintendant user type having permission to more views than the operator user type, and a manufacturer user type having permission to more views than the superintendent user type.

The controller can be configured to control the heat transfer system according to all of compressor suction superheat, compressor discharge superheat, compressor suction pressure, compressor discharge pressure, and water temperature.

According to another aspect of the present invention, a method of controlling a heat transfer system includes controlling a compressor and an electrically controlled valve for circulating a working fluid according to one or more of compressor suction superheat, compressor discharge superheat, compressor suction pressure, compressor discharge pressure, and temperature of water received at a condenser to be heated by waste-heat bearing fluid in an evaporator. The method further includes displaying on a touchscreen a user control interface configured to display views based on a permissions database defining different types of users.

The views can include different views having different input fields, output fields, and output graphs.

The method can further include requiring password protected login for at least one of the different types of users.

The permissions database can permit input of control loop parameters by one of the different types of users and prevent input of control loop parameters by another of the different types of users.

The different types of users can include an operator user type, a superintendant user type having permission to more views than the operator user type, and a manufacturer user type having permission to more views than the superintendent user type.

The method can further include controlling the heat transfer system according to all of compressor suction superheat, compressor discharge superheat, compressor suction pressure, compressor discharge pressure, and temperature of the water.

According to another aspect of the present invention, a heat transfer system includes a compressor for circulating a working fluid, the compressor having an inlet and an outlet. The compressor is operable at a controllable operating capacity. The heat transfer systems further includes a condenser connected to the outlet of the compressor, the condenser configured to receive flow of water to be heated. The heat transfer systems further includes an electrically controlled valve positioned to receive working fluid from the outlet of the condenser, and an evaporator connected between an outlet of the electrically controlled valve and the inlet of the compressor, the evaporator configured to receive flow of waste-heat bearing fluid. The heat transfer systems further includes pressure and temperature sensors positioned to measure pressures and temperatures of the heat transfer system. The heat transfer systems further includes a controller connected to the pressure and temperature sensors, the electrically controlled valve, and the compressor. The controller is configured to control the heat transfer system according to compressor suction superheat, compressor discharge superheat, compressor suction pressure, compressor discharge pressure, and water temperature. The controller includes a touchscreen configured to display a user control interface configured to display views based on a permissions database defining different types of users. The views include different views having different input fields, output fields, and output graphs. The permissions database permits input of control loop parameters by one of the different types of users and prevents input of control loop parameters by another of the different types of users.

BRIEF DESCRIPTION OF THE DRAWINGS

The drawings illustrate, by way of example only, embodiments of the present invention.

FIG. 13 is a diagram of the user control interface with a different user type logged in.

DETAILED DESCRIPTION

Figure 1:
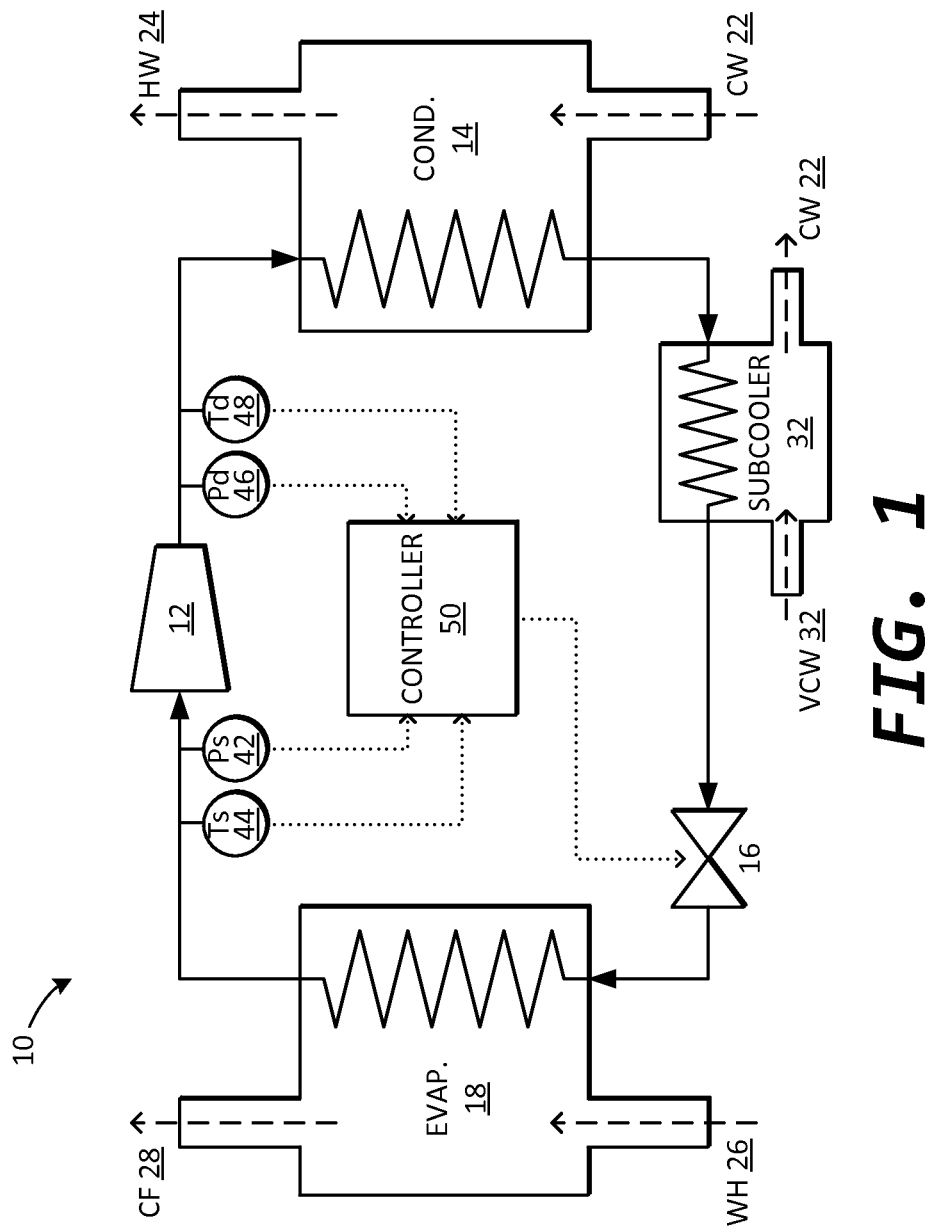
FIG. 1 is a diagram of a heat transfer system according to an embodiment of the present invention.

FIG. 1 shows a heat transfer system 10 according to an embodiment of the present invention. The heat transfer system may be known as a heat pump, refrigeration loop, or similar. The heat transfer system provides precise and robust control, particularly when used in waste-heat recovery and water heating for human use.

The heat transfer system 10 includes a compressor 12, a condenser 14, an electrically controlled expansion valve 16, and an evaporator 18 connected together in a loop by fluid conducting piping. A working fluid is provided to the system 10. The working fluid can include refrigerants, such as R-134a, R-12, R-124a, R-401a, R-404a, R-409A, R-414A, or similar.

The compressor 12 is a screw-type compressor that circulates the working fluid in the system 10. The compressor 12 has an inlet for receiving working fluid in a low-pressure vapor state, and an outlet for discharging compressed working fluid as a high-pressure vapor. In other embodiments, the compressor is another kind of compressor.

The condenser 14 has an inlet connected to the outlet of the compressor 12, and has an outlet that feeds the electrically controlled valve 16. The condenser 14 can be configured to receive water or other fluid to heat. In this embodiment, cold water 22 flows into the condenser 14 and leaves the condenser 14 as hot water 24. For example, cold water 22 arrives at between 10 and 55 degrees Celsius and is heated to hot water 24 at between 40 and 70 degrees Celsius. Other temperatures are also possible. These example temperatures are conducive to heating water for residential or hotel use for cleaning, washing, cooking, or bathing. Cold water 22 may be potable and may originate from a municipal supply, from a re-circulating hot water tank, from a boiler feed line, or similar.

The electrically controlled valve 16 is positioned to receive at its inlet condensed working fluid from the outlet of the condenser 14. The electrically controlled valve 16 may be known as an ETX valve. The electrically controlled valve 16 can include a stepper motor and gear assembly configured to position a pin in the port through which working fluid flows, so as to incrementally open or close the port to increase or decrease flow of working fluid. The electrically controlled valve 16 creates a controllable pressure drop in the working fluid, thereby expanding the working fluid into a mixed vapor-liquid state at its outlet. Control of the valve 16 controls the pressure drop and thus the exiting quality, temperature, and pressure of the working fluid.

The evaporator 18 is connected between the outlet of the electrically controlled valve 16 and the inlet of the compressor 12. The evaporator 18 can be configured to receive a heat-bearing medium, such as water, an alternative liquid, or a gas. In this embodiment, waste-heat bearing fluid 26, such as that available from air-conditioning systems, enters the evaporator 18 and discharges its heat to the working fluid, before leaving the evaporator 18 as cooled fluid 28. The temperature of the arriving waste-heat bearing fluid 26 may be between about 10 and 50 degrees Celsius. Other temperatures are also possible.

The system 10 may further include a subcooler 32 connected between the condenser 14 and the electrically controlled valve 16. Flow of working fluid through the subcooler 32 may discharge heat to very cold water 34, having a temperature below the temperature of the cold water input to the condenser 14. Warmed water exiting the subcooler 32 may be fed into the condenser 14 as cold water 22.

The system 10 further includes a suction pressure sensor 42 located between the outlet of the electrically controlled valve 16 and the inlet of the compressor 12. In this embodiment, the suction pressure sensor 42 is located near the inlet of the compressor 12. The specific location of the suction pressure sensor 42 can be varied, provided that the pressure drop expected between the location of the suction temperature sensor 44 and the compressor 12 is taken into account.

The system 10 further includes a suction temperature sensor 44 located at the inlet of the compressor 12.

The system 10 further includes a controller 50 connected to the suction pressure sensor 42, the suction temperature sensor 44, and the electrically controlled valve 16. The controller 50 can include a processor, memory, input interface, and output interface. The controller 50 is configured to adjust the electrically controlled valve 16 to maintain output of the suction pressure sensor 42 and the suction temperature sensor 44 at levels above a saturation point of the working fluid.

Figure 2:
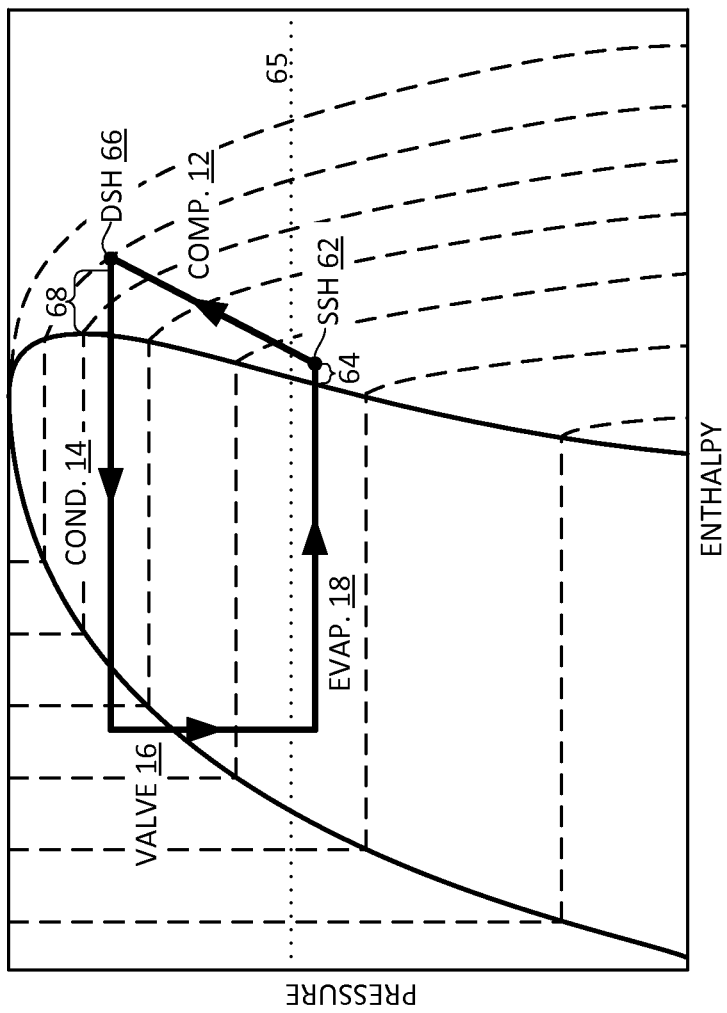
FIG. 2 is a pressure-enthalpy chart for the working fluid and the heat transfer system.

FIG. 2 shows a pressure-enthalpy chart for the working fluid. No specific working fluid is depicted. However, the chart applies to at least those working fluids mentioned herein. Isothermals are shown in dashed line.

The controller 50 is configured to adjust (e.g., incrementally open or close) the electrically controlled valve 16 to maintain output of the suction temperature sensor 44 at a suction superheat temperature 62. To achieve this, a suction superheat set point 64 is set above the saturation point of the working fluid. Maintaining the suction superheat temperature 62 to be at the suction superheat set point 64 can prevent the evaporator 18 from overheating the working fluid, which may detrimentally affect output of the compressor 12 and cost compressor power, and may also prevent under-heating the working fluid, which can advantageously prevent liquid-state working fluid from entering the compressor 12.

The controller 50 determines compressor inlet saturation temperature from output of the suction pressure sensor 42 and subtracts the determined saturation temperature from the output of the suction temperature sensor 44 to determine the actual suction superheat temperature 62. The controller 50 employs a suction superheat control loop to maintain the suction superheat temperature 62 at the suction superheat set point 64 by controlling the electrically controlled valve 16. Example values for the suction superheat set point 64 include 3-5 degrees Kelvin, and similar values above saturation suitable for a safety margin above saturation. The suction superheat set point 64 is a differential temperature relative to the saturation temperature and so can be expressed in relative units such as Celsius or Fahrenheit or absolute units such as Kelvin or Rankine.

In operation, when the heat input from the waste-heat bearing water 26 decreases, the system 10 may tend to output lower temperature working fluid at the evaporator 18, which may bring the working fluid exiting the evaporator 18 towards a saturated state. The risk of saturation at the compressor inlet is reduced or prevented by the controller 50 maintaining the suction superheat temperature 62 at the suction superheat set point 64.

The controller 50 may also be configured to incrementally close the electrically controlled valve 16 to maintain the output of the suction pressure sensor 42 to below a maximum suction pressure 65. This can advantageously maintain the suction pressure below the suction pressure limit of the compressor, particularly when the temperature of waste-heat bearing water 26 is relatively high. The maximum suction pressure 65 can be expressed in units of pressure or as a maximum saturation temperature, with output of the suction pressure sensor 42 being converted to saturation temperature to allow comparison.

Referring back to FIG. 1, the system 10 can further include a discharge pressure sensor 46 located between the outlet of the compressor 12 and the inlet of the electrically controlled valve 16. In this embodiment, the discharge pressure sensor 46 is located near the outlet of the compressor 12. The specific location of the discharge pressure sensor 46 can be varied, provided that the pressure drop expected between the location of the discharge pressure sensor 46 and the outlet of the compressor is taken into account. The system 10 can further include a discharge temperature sensor 48 located at the outlet of the compressor 12.

The controller 50 can be further configured to incrementally close the electrically controlled valve 16 to maintain output of the discharge pressure sensor 46 and the discharge temperature sensor 48 at levels above saturation of the working fluid.

Referring again to FIG. 2, the controller 50 is configured to incrementally close the electrically controlled valve 16 to maintain output of the discharge temperature sensor 48 at a discharge superheat temperature 66 that is above a minimum discharge superheat temperature 68. This can advantageously maintain the discharge superheat, particularly on start-up when the system 10 is cold or when the suction pressure is high and the discharge pressure is low. Operating the compressor 12 too close to saturation at discharge can result in liquid-state working fluid entering the lubricating oil system of the compressor 12. This problem is particularly evident in semi-hermetic screw-type compressors, which permit working fluid to enter the oil separator and may allow working fluid to cool significantly at discharge. Thus, the compressor discharge is controlled by maintaining the discharge superheat temperature 66 at least a minimum discharge superheat temperature 68 amount above the saturation point of the working fluid.

The controller 50 determines compressor discharge saturation temperature from output of the discharge pressure sensor 46 and subtracts the determined saturation temperature from the output of the discharge temperature sensor 48 to determine the actual discharge superheat temperature 66. The controller 50 employs a discharge superheat control loop to maintain the discharge superheat temperature 66 at above the minimum discharge superheat temperature 68 by incrementally closing the electrically controlled valve 16. Example values for minimum discharge superheat temperature 68 include 20-25 degrees Kelvin, and similar values above saturation sufficient to prevent working fluid from cooling excessively inside the compressor 12 where it may contaminate lubricating oil and reduce the service life of the compressor 12. The minimum discharge superheat temperature 68 is a differential temperature relative to the saturation temperature and so can be expressed in relative units such as Celsius or Fahrenheit or absolute units such as Kelvin or Rankine.

Discharge pressure of the compressor 12 can be allowed to float based on control using the suction superheat set point 64, maximum suction pressure 65, and the minimum discharge superheat temperature 68. The controller 50 is thus configured to adjust the electrically controlled valve 16 to maintain evaporator 18 pressure as high as practical, while not exceeding the suction pressure limit of the compressor 12 and also while preventing saturated working fluid from condensing in the oil separator of compressor 12.

It can be seen from FIG. 2 that the system 10, when applied to waste heat recovery for heating residential or hotel water, operates at a relatively high end of the thermodynamic cycle for the working fluid. This allows efficient use of commonly available and safe working fluids to recover waste heat.

Figure 3:
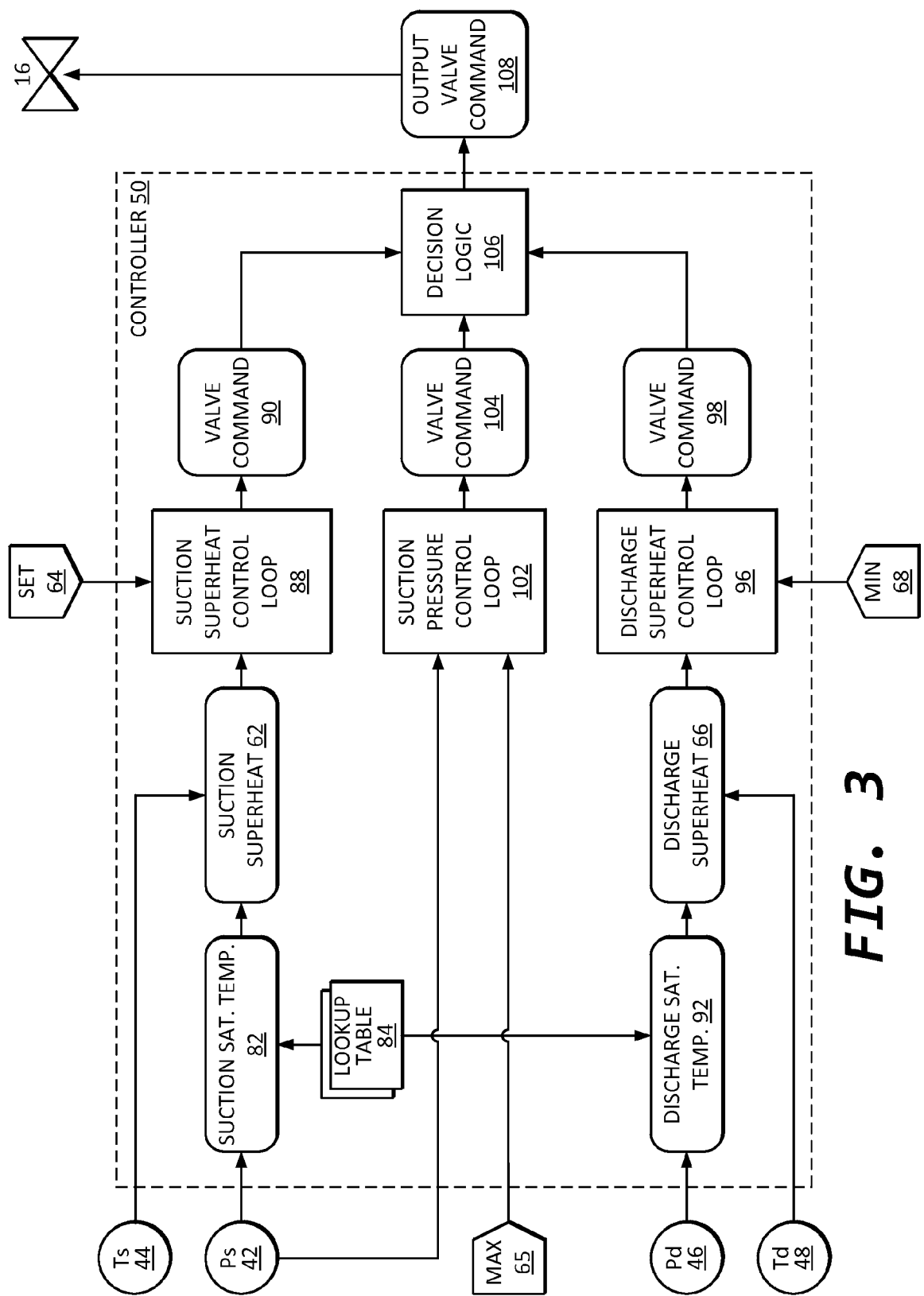
FIG. 3 is a block diagram of control logic of the controller.

FIG. 3 illustrates control logic resident in the controller 50. The control logic can implement the methods and other techniques described herein. As such, the control logic may take the form of a specialized computer program, a group of parameters inputted into a preprogrammed control routine, or the like.

Output from the suction pressure sensor 42 is converted to a saturation temperature 82 at the inlet of the compressor 12. The can be performed with reference to a lookup table 84 that stores relationships between saturation pressures and saturation temperatures for the working fluid. The measured suction temperature from the suction temperature sensor 44 is reduced by the suction saturation temperature 82 to arrive at the actual suction superheat temperature 62.

The actual suction superheat temperature 62 and the suction superheat set point 64 are provided as inputs to a suction superheat control loop 88 whose output is a suction superheat valve command 90 for adjusting the electrically controlled valve 16. The suction superheat valve command 90 is a change in valve position that brings the actual suction superheat temperature 62 towards the suction superheat set point 64. The suction superheat set point 64 can be inputted by an operator of the system 10. The actual suction superheat temperature 62 and the suction superheat set point 64 can be expressed as true temperatures on a standard scale (e.g., 25 degrees Celsius) or as temperatures relative to saturation temperature (e.g., 5 degrees Celsius or Kelvin, or by convention "5K"). It is expected that such an incremental change in the valve 16 position is an incremental opening or closing of the valve 16.

Similarly, output from the discharge pressure sensor 46 is converted to a saturation temperature 92 at the outlet of the compressor 12 with reference to the lookup table 84. The measured discharge temperature from the discharge temperature sensor 48 is reduced by the discharge saturation temperature 92 to arrive at the actual discharge superheat temperature 66. The actual discharge superheat temperature 66 and the minimum discharge superheat temperature 68 are provided as inputs to a discharge superheat control loop 96 whose output is a discharge superheat valve command 98 for adjusting the electrically controlled valve 16. The discharge superheat valve command 98 is an incremental change in the valve 16 position that keeps the actual discharge superheat temperature 66 above the minimum discharge superheat temperature 68. It is expected that such an incremental change in the valve 16 position is an incremental closing of the valve 16. The minimum discharge superheat temperature 68 can be inputted by an operator of the system 10. The superheat temperatures 66, 68 can be expressed in a standard scale (e.g., 80 degrees Celsius) or as relative temperatures (e.g., 20K).

An operator-adjustable maximum suction pressure 65 and the output of the suction pressure sensor 42 are taken as inputs to a suction pressure control loop 102, which outputs a suction pressure valve command 104 representing an incremental change in the valve 16 position that keeps the measured suction pressure below the maximum suction pressure 65. It is expected that such an incremental change in the valve 16 position is an incremental closing of the valve 16.

The control loops 88, 96, 102 may each be PI, PID, or P feedback control loop that provides error output representative of an incremental valve opening or closing value. In this embodiment, the control loops 88, 96, 102 are PI feedback control loops.

Decision logic 106 determines which of the valve commands 90, 98, 104 to send to the electrically controlled valve 16 as the actual valve command 108. In this embodiment, the decision logic 106 selects the valve command 90, 98, 104 that requests the largest increment of closing. If no valve command 90, 98, 104 requests an incremental closing of the valve 16, then the control logic selects the suction superheat valve command 90. This results in the ignoring of any incremental open requests from the discharge superheat valve command 98 and the suction pressure valve command 104. In other words, the controller 50 incrementally adjusts the valve 16 based on the suction superheat set point 64, unless the discharge superheat temperature 68 falls below its minimum 68 or the suction pressure 42 exceeds its maximum 65, in which case the controller 50 incrementally closes the valve 16 by the maximum closing increment requested. That is, the suction superheat control loop 88 controls the valve 16, unless incremental valve closing is requested by either or both of the suction pressure control loop 102 and the discharge superheat control loop 96, in which case control of the valve is passed to the control loop 102, 96 or 88 requesting largest incremental amount of valve closing.

Figure 4:
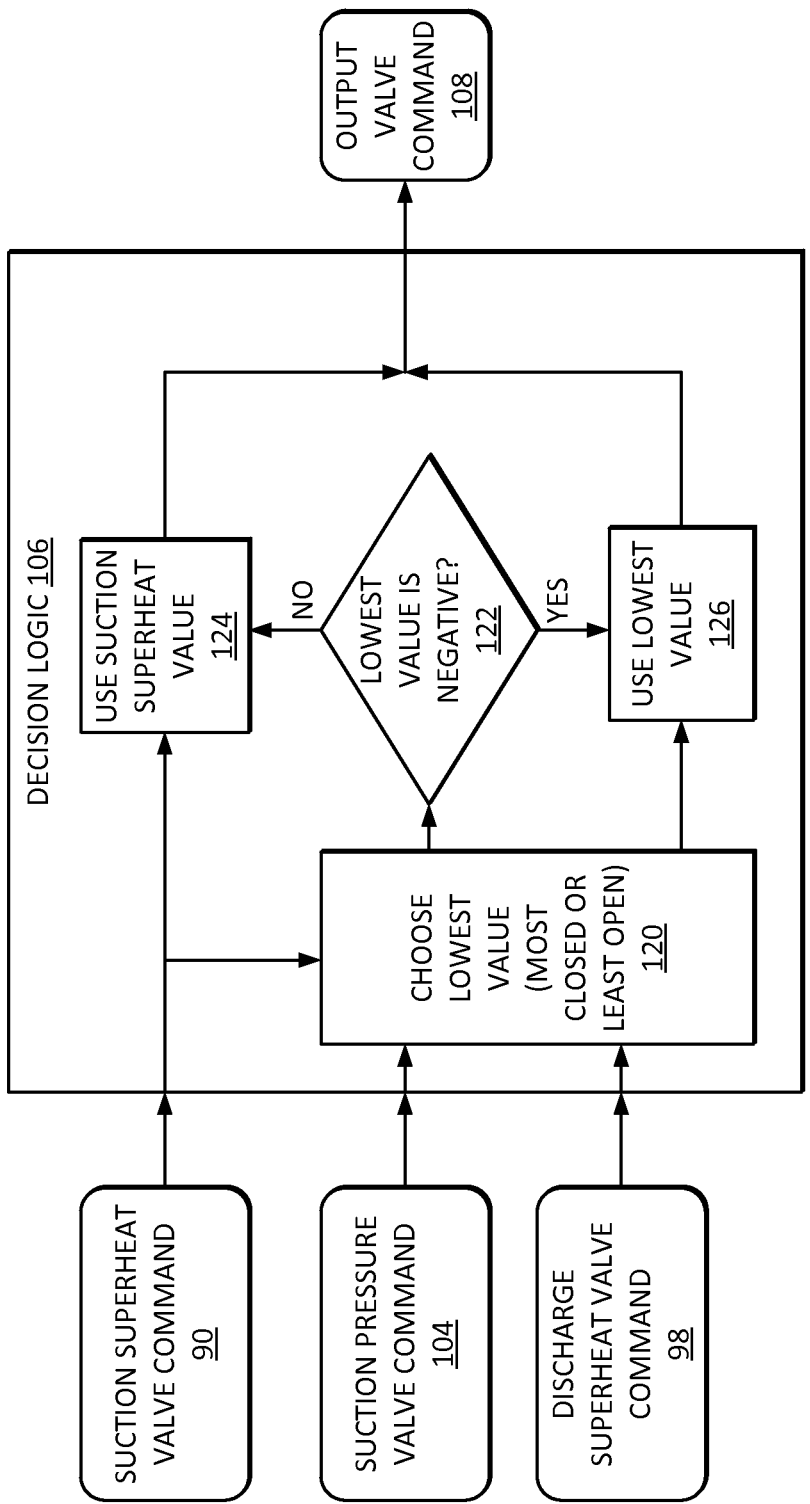
FIG. 4 is a block diagram of decision logic of the controller.

FIG. 4 illustrates an example embodiment of the decision logic 106, assuming that incremental close commands are represented by negative values and incremental open commands are represented by positive values. The lowest value out of the suction superheat valve command 90, the suction pressure valve command 104, and the discharge superheat valve command 98 is selected at 120. If the lowest value is not negative, as determined at 122, then the value of the suction superheat valve command 90 is taken, at 124, as the output valve command 108. If the lowest value is negative, then, at 126, the lowest value is taken as the output valve command 108 to control the valve 16 to incrementally close.

The control process illustrated in FIGS. 3 and 4 repeats in real time or near real time, as the system 10 operates.

The controller 50 may further provide for an alarm shutdown if any of the sensors 42-48 detects an abnormal condition on one of the control loops.

Figure 5:
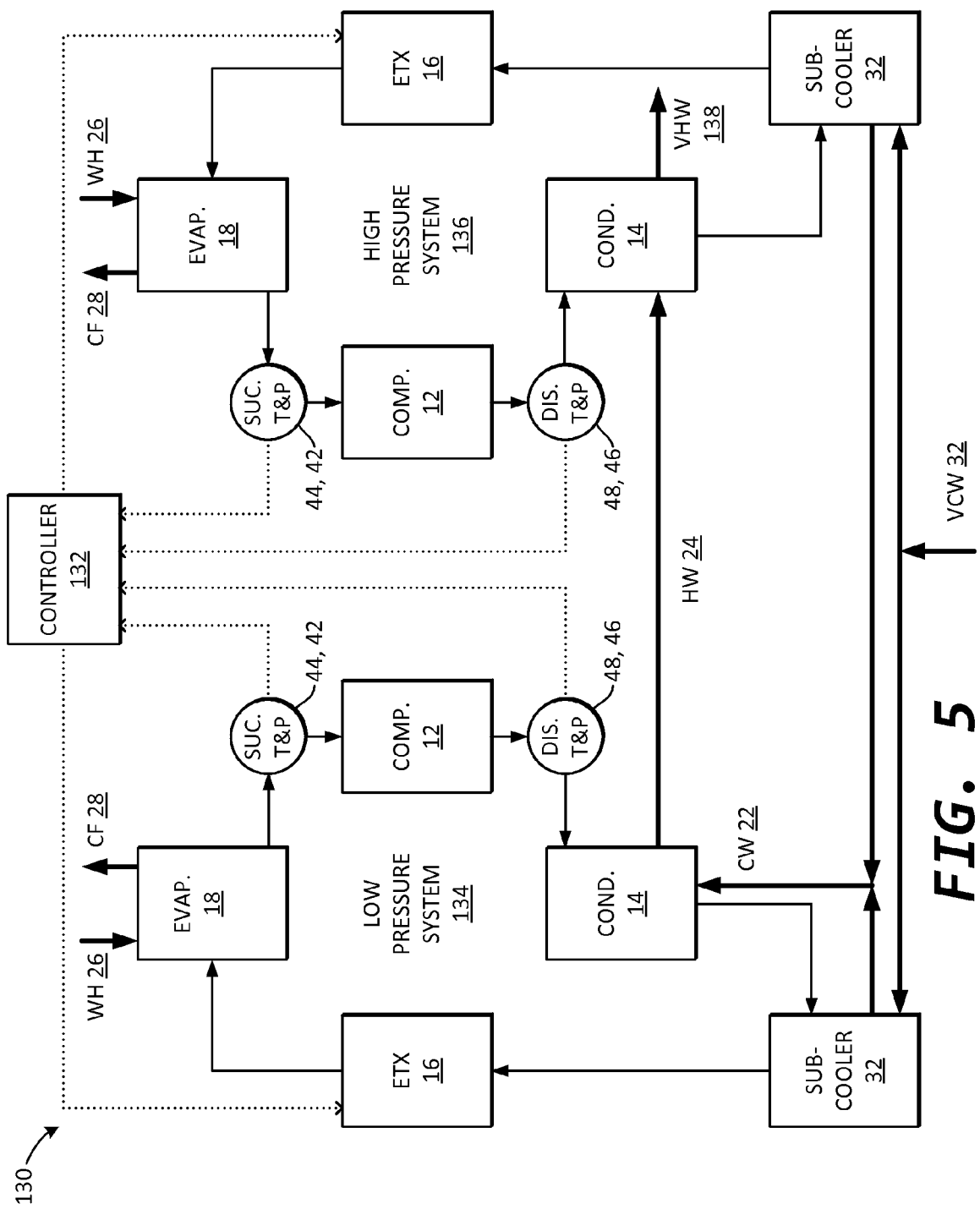
FIG. 5 is a diagram of a heat transfer system according to another embodiment.

FIG. 5 illustrates another embodiment of a heat transfer system 130 according to the present invention. The system 130 is similar to the system 10 and only differences will be discussed in detail. For description of other features and aspects of the system 130, description of the system 10 can be referenced, with like numerals identifying like components.

The heat transfer system 130 uses two of the heat transfer systems 10, one a low-pressure system 134 to provide initial heating to water and another a high-pressure system 136 to provide further heating to the water.

The evaporators 18 may each receive waste-heat bearing fluid 26 and output cooled fluid 28. The subcoolers 32 may be fed in parallel with very cold water 32, which is warmed at 22 and then fed through the low-pressure system's condenser 14 before being fed through the high-pressure system's condenser 14, so that the water is progressively heated. Heated water 24 exits the first condenser 14 and further heated water 138 exits the second condenser 14.

A controller 132 controls operation of the low-pressure system 134 and the high-pressure system 136. The systems 134, 136 may use different working fluids and may be controlled at different pressures and temperatures. However, the principles of control are the same as discussed above.

The controller 132 operates using the teachings discussed herein for the control 50. That is, the controller 132 references the compressor suction temperature and pressure for each system 134, 136 to adjust the respective electrically controlled valve 16 to maintain the working fluid at the inlet of each of the compressors 50 at a respective suction superheat set point. At the same time, the controller 132 may reference compressor suction pressure for each system to incrementally close the respective electrically controlled valves 16 to maintain each suction pressure to below a respective maximum suction pressure. Further, the controller 132 may control the discharge temperature and pressure for each system 134, 136 to adjust the respective electrically controlled valve 16 to keep the working fluid at the outlet of the compressor 50 above a respective minimum discharge superheat temperature.

The suction superheat set points, the maximum suction pressures, and the minimum discharge superheat temperatures may be different or the same for each of the low-pressure system 134 and the high-pressure system 136. For example, the suction superheat set points and the minimum discharge superheat temperatures may be the same in both the low-pressure system 134 and the high-pressure system 136, while different maximum suction pressures may be used for the systems 134, 136. Other examples are also contemplated.

Figure 6:
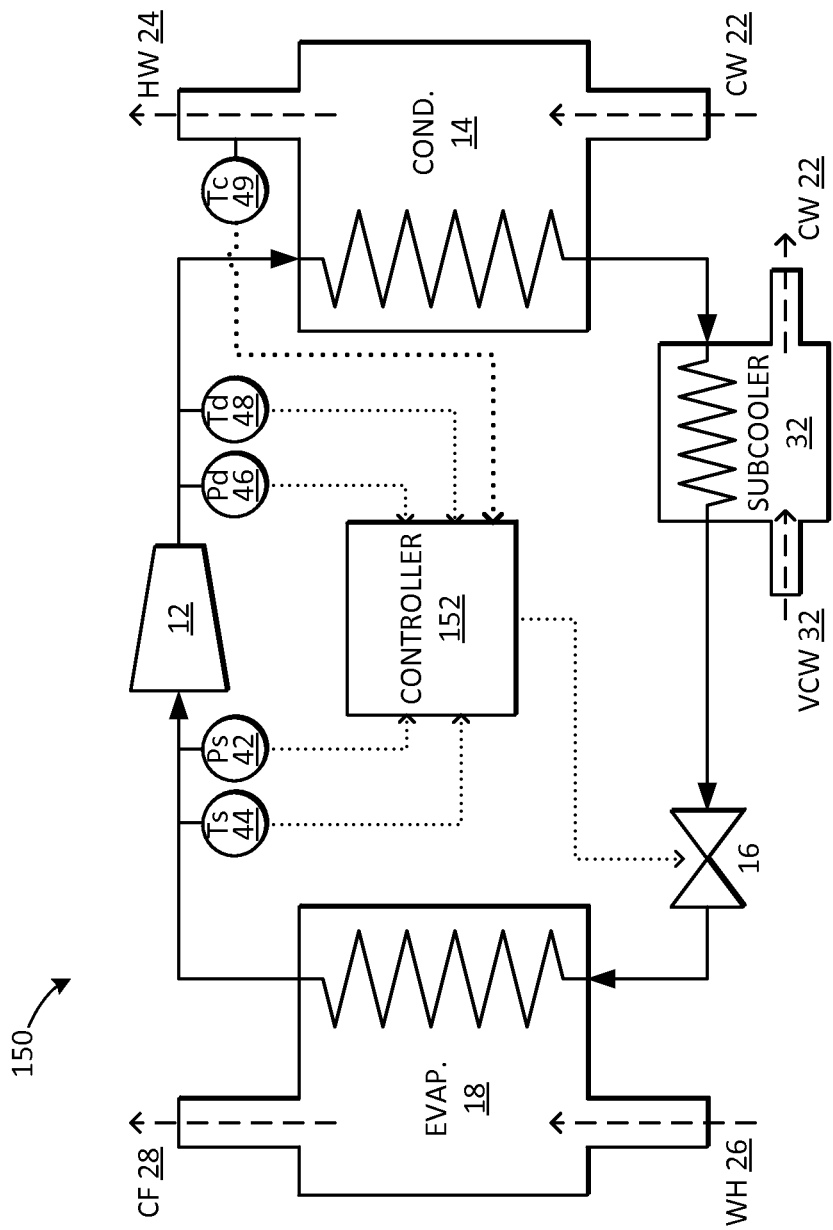
FIG. 6 is a diagram of a heat transfer system according to another embodiment.

FIG. 6 illustrates another embodiment of a heat transfer system 150 according to the present invention. The system 150 is similar to the system 10 and only differences will be discussed in detail. For description of other features and aspects of the system 150, description of the system 10 can be referenced, with like numerals identifying like components. In addition, the system 150 can be used for each of the high- and low-pressure systems 136, 134 of FIG. 5.

The system 150 includes a condenser temperature sensor 49 located at the condenser 14. In this embodiment, the condenser temperature sensor 49 is located at the outlet of the condenser 14 in or near the flow of heated water 24. In other embodiments, the condenser temperature sensor 49 is located at other locations, such as inside the water-side of the condenser itself or in the flow of heated water 24 downstream of the condenser 14. Any of these locations, as well as other locations, can be considered as at the condenser 14.

The controller 152 references output of the condenser temperature sensor 49 to adjust the operating capacity of the compressor 12 to maintain the temperature measured by the condenser temperature sensor at a condenser temperature set point. Further, the controller 152 is also configured to reduce the operating capacity of the compressor 12 when the output of the discharge pressure sensor 46 indicates that a maximum operating pressure of the compressor 12 has been exceeded. The maximum operating pressure corresponds to a saturation temperature that is higher than the condenser temperature set point. Further, the compressor 12 may be shut down when output of the discharge pressure sensor 46 indicates that a shutdown pressure has been exceeded. In the present embodiment, shutdown may also occur when the compressor reaches its minimum capacity and cannot be reduced any further. The shutdown pressure corresponds to a saturation temperature that is higher than the saturation temperature of the maximum operating pressure. In other embodiments, the electrically controlled valve 16 can be closed to reduce the compressor capacity in conjunction with or without the compressor's 12 internal capacity control.

The controller 152 can also be configured as discussed elsewhere herein to, for example, incrementally close the electrically controlled valve 16 when output of the discharge temperature sensor 48 falls below the minimum discharge superheat temperature 68, incrementally close the valve 16 when the maximum suction pressure 65 is exceeded, and adjust the valve 16 so that the suction superheat temperature 62 tracks the suction superheat set point 64.

Figure 7:
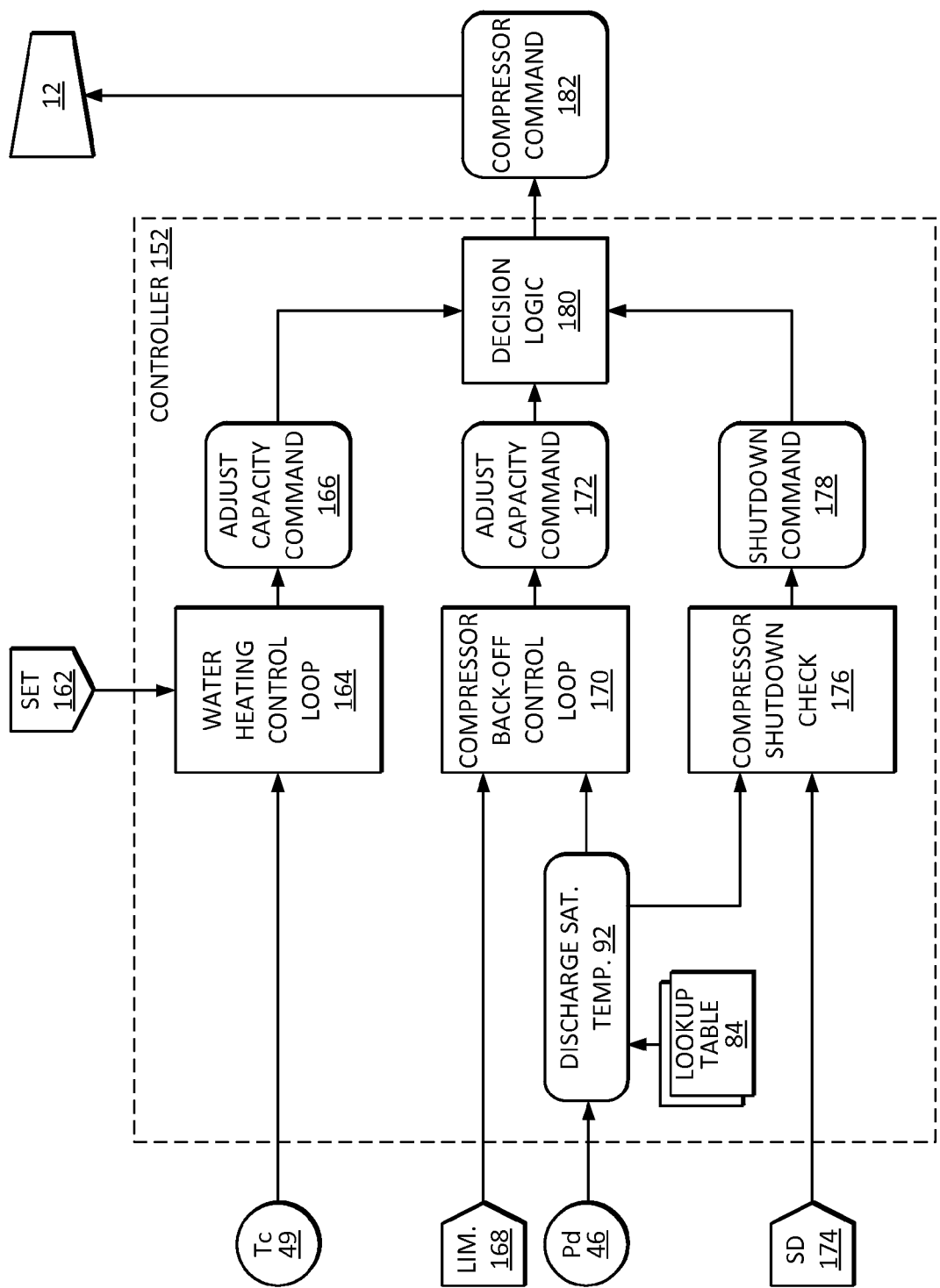
FIG. 7 is a block diagram of control logic of the controller according to another embodiment.

FIG. 7 illustrates control logic resident in the controller 152. The control logic can implement the methods and other techniques described herein. As such, the control logic may take the form of a specialized computer program, a group of parameters inputted into a preprogrammed control routine, or the like. Control logic of the controller 152 can be combined with control logic of the controller 50 (FIG. 3).

Output of the condenser temperature sensor 49 and a condenser temperature set point 162 are provided as inputs to a water-heating control loop 164 whose output is an adjust capacity command 166 for adjusting the operating capacity of the compressor 12. The adjust capacity command 166 represents a change in compressor operating capacity that brings the measured condenser temperature towards the set point 162. For example, if the measured condenser temperature rises above the set point 162, then the compressor capacity is reduced. Conversely, if the measured condenser temperature drops below the set point 162, then the compressor capacity is increased. The condenser temperature set point 162 can be inputted by an operator of the system 150. The output of the condenser temperature sensor 49 and the condenser temperature set point 162 can be expressed as true temperatures on a standard scale (e.g., 60 degrees Celsius).

In this embodiment, a maximum operating pressure for the compressor 12 can be inputted as a saturation temperature operating limit 168. Output from the discharge pressure sensor 46 is converted to the discharge saturation temperature 92 with reference to the lookup table 84, which stores relationships between saturation pressures and saturation temperatures for the working fluid. The discharge saturation temperature 92 and the saturation temperature limit 168 are used as inputs by a compressor back-off control loop 170, which is configured to output an adjust capacity command 172 to keep the discharge saturation temperature 92 below the saturation temperature limit 168. In other embodiments, the compressor back-off control loop 170 operates on pressure values directly.

In addition, a shutdown pressure for the compressor 12 can be inputted as a shutdown saturation temperature 174. The discharge saturation temperature 92 and the shutdown saturation temperature 174 are used as inputs by a compressor shutdown check 176 which is configured to output a shutdown command 178 when the compressor 12 maximum safe pressure has been exceeded. In other embodiments, the compressor shutdown check 176 operates on pressure values directly.

The control loops 164, 170 may each be PI, PID, or P feedback control loop that provides error output representative of an incremental change in compressor capacity. The compressor shutdown check 176 can include a logical comparison that acts on inputted values and outputs a resulting value.

Decision logic 180 selects one of the adjust capacity commands 166, 172 and the shutdown command 178 to send to the compressor 12 as the actual compressor command 182. In this embodiment, the decision logic 180 is as follows. Presence of a shutdown command 178 always results in the compressor 12 being shut down. Otherwise, the adjust capacity command 172 from the back-off control loop 170 is selected if it represents the greatest amount of reduced capacity for the compressor 12, while the adjust capacity command 166 from the water-heating control loop 164 is selected at all other times. In other words, assuming that reducing capacity commands have negative values and increasing capacity commands are positive, if no shutdown command 178 is present, then the decision logic 180 selects the lowest negative value from the control loops 164, 170. If no negative value is available, then the decision logic 180 selects the positive value from the water-heating control loop 164. Thus, the compressor 12 is operated according to the water-heating control loop 164, unless further reduced capacity is demanded by the back-off control loop 170, and both of these control schemes are overridden by the shutdown check 176.

Figure 8:
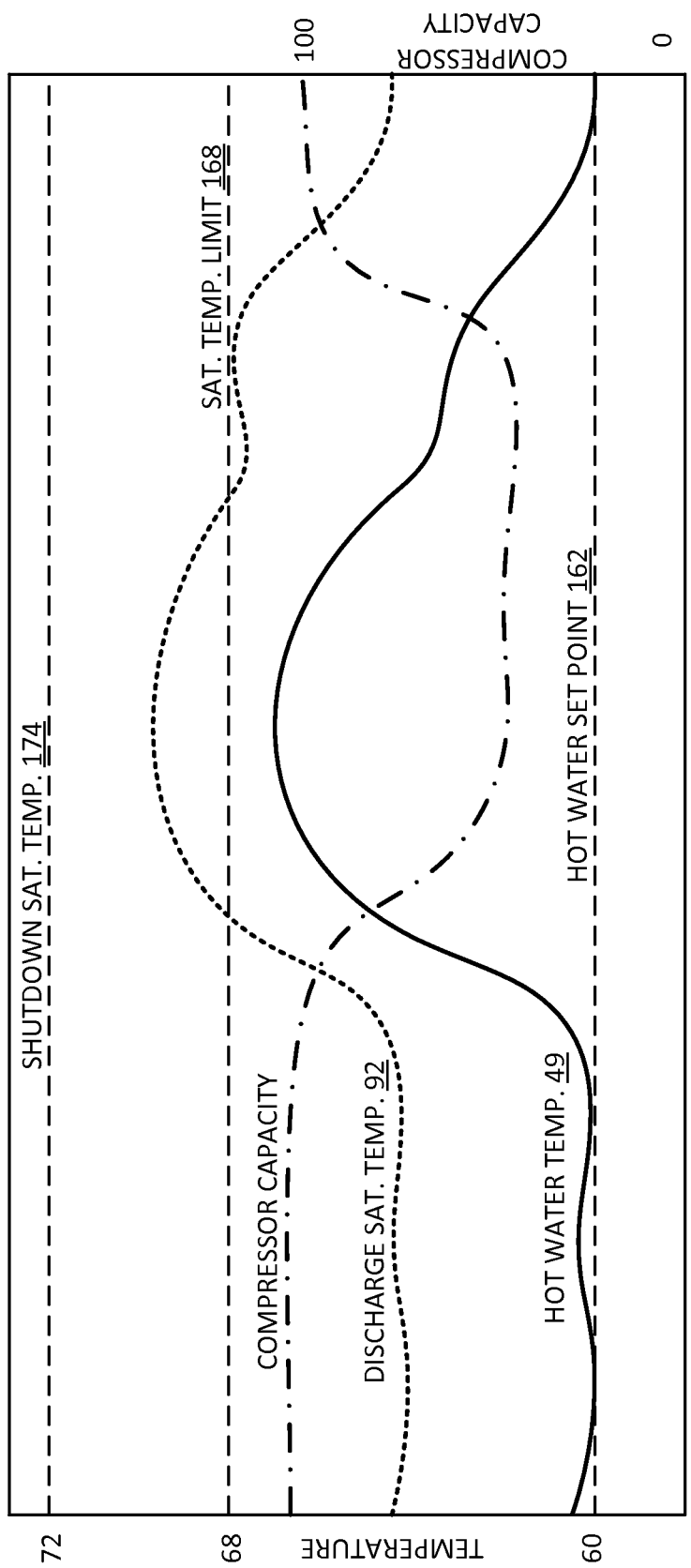
FIG. 8 is a graph showing an example of compressor control.

FIG. 8 shows an example of operation of the system 150 as controlled by the controller 152 when the system 150 is used for water heating.

Initially, the temperature of hot water 24 output by the condenser 14, as measured by the condenser temperature sensor 49, tracks the set point 162 of, for example, 60 degrees Celsius. The discharge saturation temperature 92 of the compressor 12 is somewhat higher (e.g., 64 degrees Celsius) at this time due to the temperature approach at the hot end which, is present to a larger or smaller degree in all heat exchangers, and the compressor 12 is running at full capacity.

After operating at steady state for a time, a disturbance occurs, such as a normal reduction in flow rate of cold water 22 into the condenser 14. Consequently, the hot water temperature 49 rises. The water-heating control loop 164 responds by reducing the compressor capacity. However, the hot water temperature 49 continues to rise. As a result, the compressor discharge saturation temperature 92 rises to exceed the saturation temperature limit 168 (e.g., 68 degrees Celsius). In response, the compressor back-off control loop 170 commands the compressor 12 to further reduce capacity until the discharge saturation temperature 92 is below the saturation temperature limit 168, thereby avoiding compressor shutdown at the shutdown saturation temperature 174 (e.g., 72 degrees Celsius).

A short time later, the flow rate of cold water 22 into the condenser 14 increases, and the temperatures 92, 49 drop enough so that control of the compressor 12 is returned to the water-heating control loop 164.

As can be seen, controlling the compressor 12 in this way prevents shutdown of the compressor 12. Further, use of the compressor back-off control loop 170 permits the operation of system 150 over a wider range of inlet conditions for cold water 22. By enabling system 150 to operate in this manner, the number of starts and stops of compressor 12 are reduced. This is advantageous as it provides more consistent temperature of hot water 24 and extends the life of compressor 12. Other advantages will be apparent to those skilled in the art.

Figure 9:
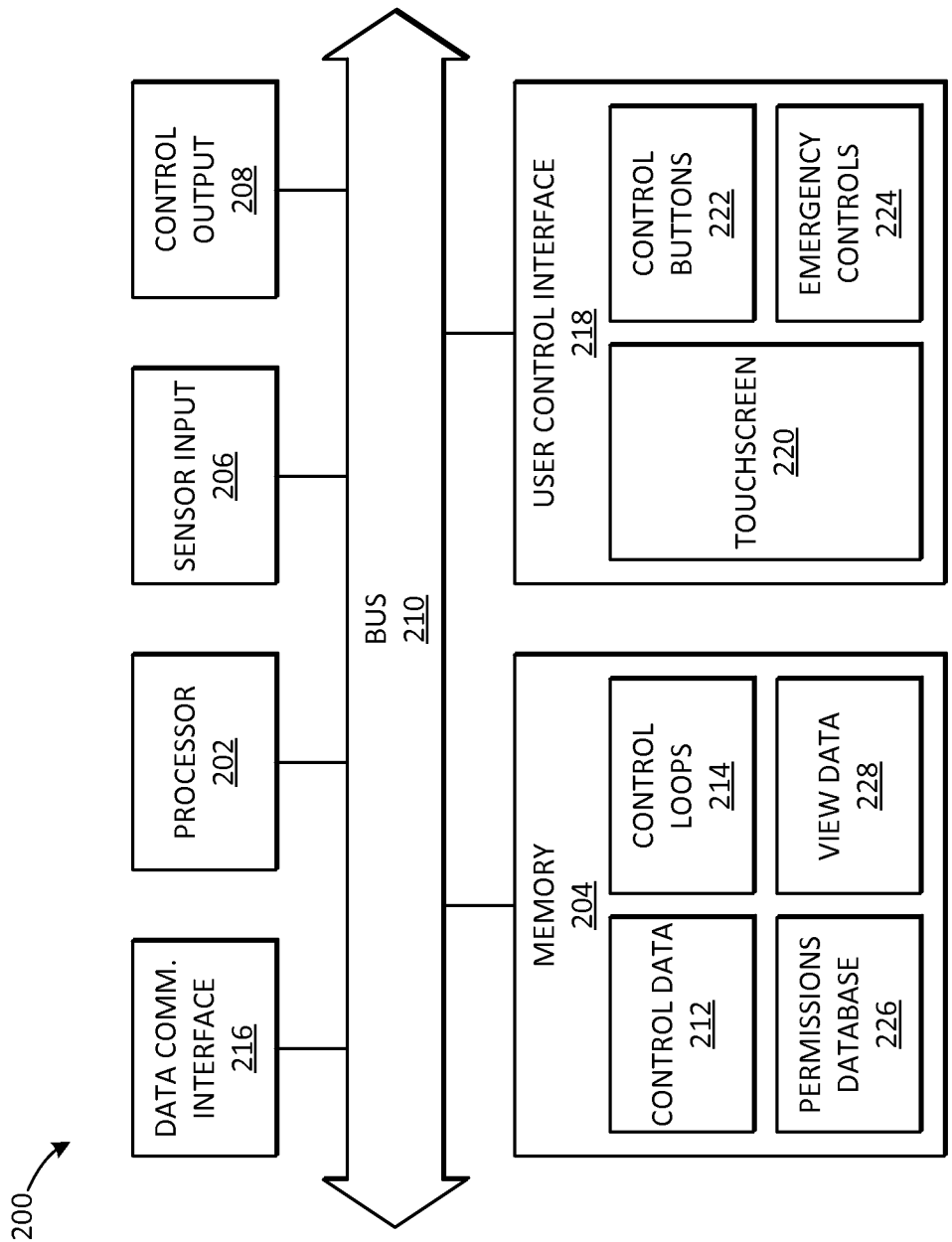
FIG. 9 is a block diagram of a controller according to some embodiments.

FIG. 9 shows a block diagram of a controller 200 according to some embodiments of the present invention. The controller 200 can be used as any of the controllers 50, 132, 152 discussed herein, and can implement any of the control logic discussed.

The controller 200 includes a processor 202, memory 204, sensor input 206, and control output 208. The components of the controller are connected together by a bus 210.

The processor 202 operates on instructions originating from the memory 204 and can execute programs stored in the memory 204 to perform the methods described herein.

The memory 204 can include any one or more of solid-state memory (e.g., RAM, ROM, flash memory), a hard drive, an optical drive, and the like. The memory 204 can include volatile and non-volatile components. The memory 204 stores control data 212 and control loops 214. The control data 212 can include any of the maximum values, minimum values, set point values, and command values described herein, as well as conversion factors for converting between human-intelligible units (e.g., degrees Celsius) and control units (e.g., volts, pulses). The control data 212 can further include one or more lookup tables, as discussed herein. The control loops 214 can include any of the control loops or checks discussed herein.

The sensor input 206 includes terminals for connecting wires running from sensors, so as to receive sensor output signals.

The control output 208 includes terminals for connecting wires running to actuators, motors, and the like for electrically controlling components of the systems described herein.

The controller 200 further includes a data communications interface 216 connected to the bus 210, such as a network adaptor, serial port, and the like. The data communications interface 216 allows for changing or upgrading any of the contents of the memory 204.

The controller 200 further includes a user control interface 218 connected to the bus 210. The user control interface 218 can include a touchscreen 220, control buttons or switches 222, and emergency controls 224. The touchscreen 220 may contain an internal processor, memory and data communications interface that is separate from processor 202, memory 204 and data communications interface 216. The control buttons 222 and emergency controls 224 are physical controls that can be activated at any time to issue control commands to the controller 200. For example, control buttons 222 may include physical buttons that control general parameters of the controller 200, such as the brightness of the touchscreen 220. The emergency controls 224 may include an emergency shutdown button.

The memory 204 further stores a permissions database 226 and view data 228. The view data 228 stores different views for the touchscreen 220 to display, so as to allow for control of the heat transfer system connected to the controller 200. The permissions database 226 stores data that defines access levels for the views defined by the view data 228, so as to provide at least two different levels of access.

Figure 10:
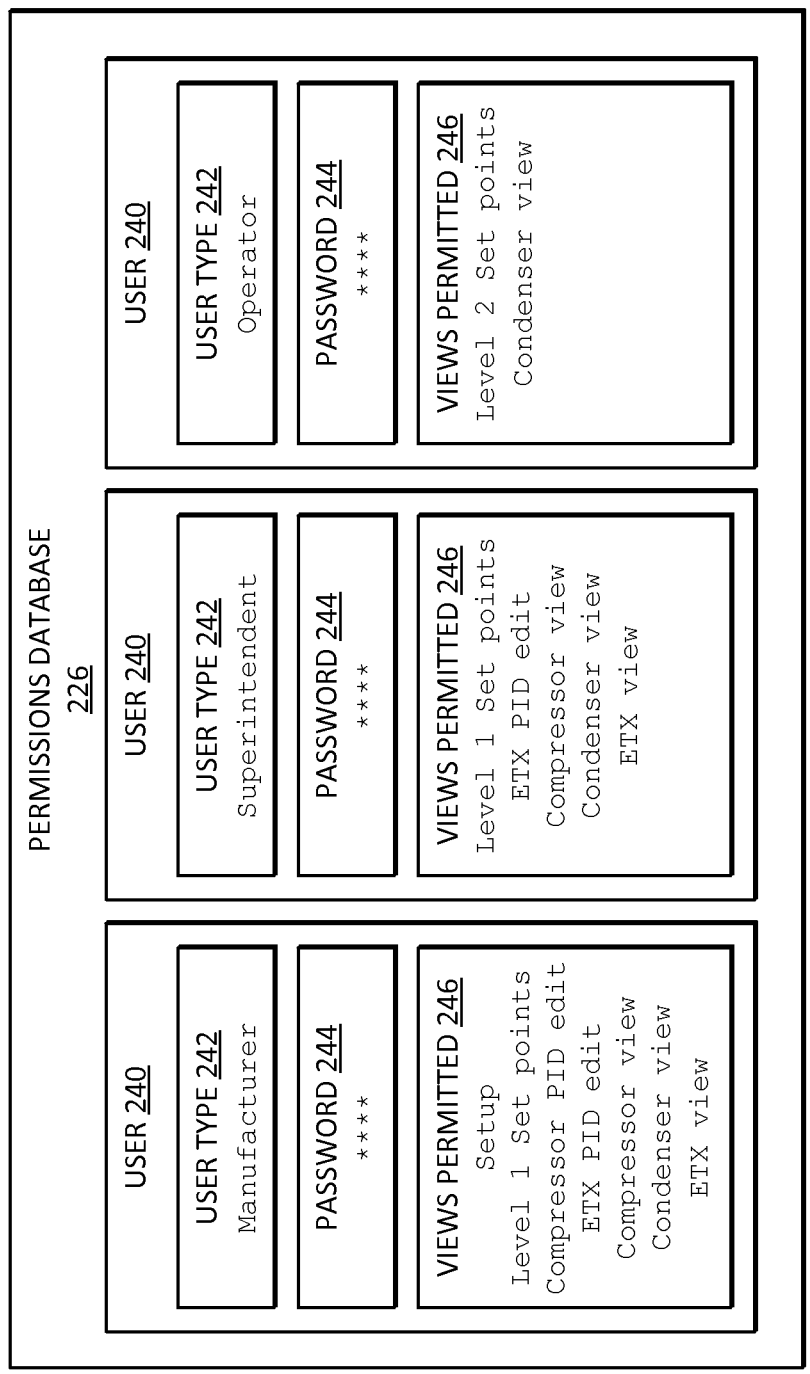
FIG. 10 is a diagram of a data structure for the permissions database according to some embodiments.

FIG. 10 shows an example of a data structure for the permissions database 226 according to some embodiments.

One or more user data sets 240 include data records for user type 242, password 244, and permitted views 246. Thus, password-protected access to the permitted views 246 can be established for different users or groups of users. In the example shown, a "Manufacturer" user type is given access to all views, including views that may permit entry of potentially unsafe control parameters for the heat transfer system. This allows a person associated with the manufacture of the system to fully troubleshoot the system. A "Superintendent" user type is given access to some views, such as views that allow entry of set points (e.g., "Level 1 Set points"), maximums, or minimums. An "Operator" user type is given the least access, and may only be permitted to view output and adjust a smaller group of set points (e.g., "Level 2 Set points").

Figure 11:
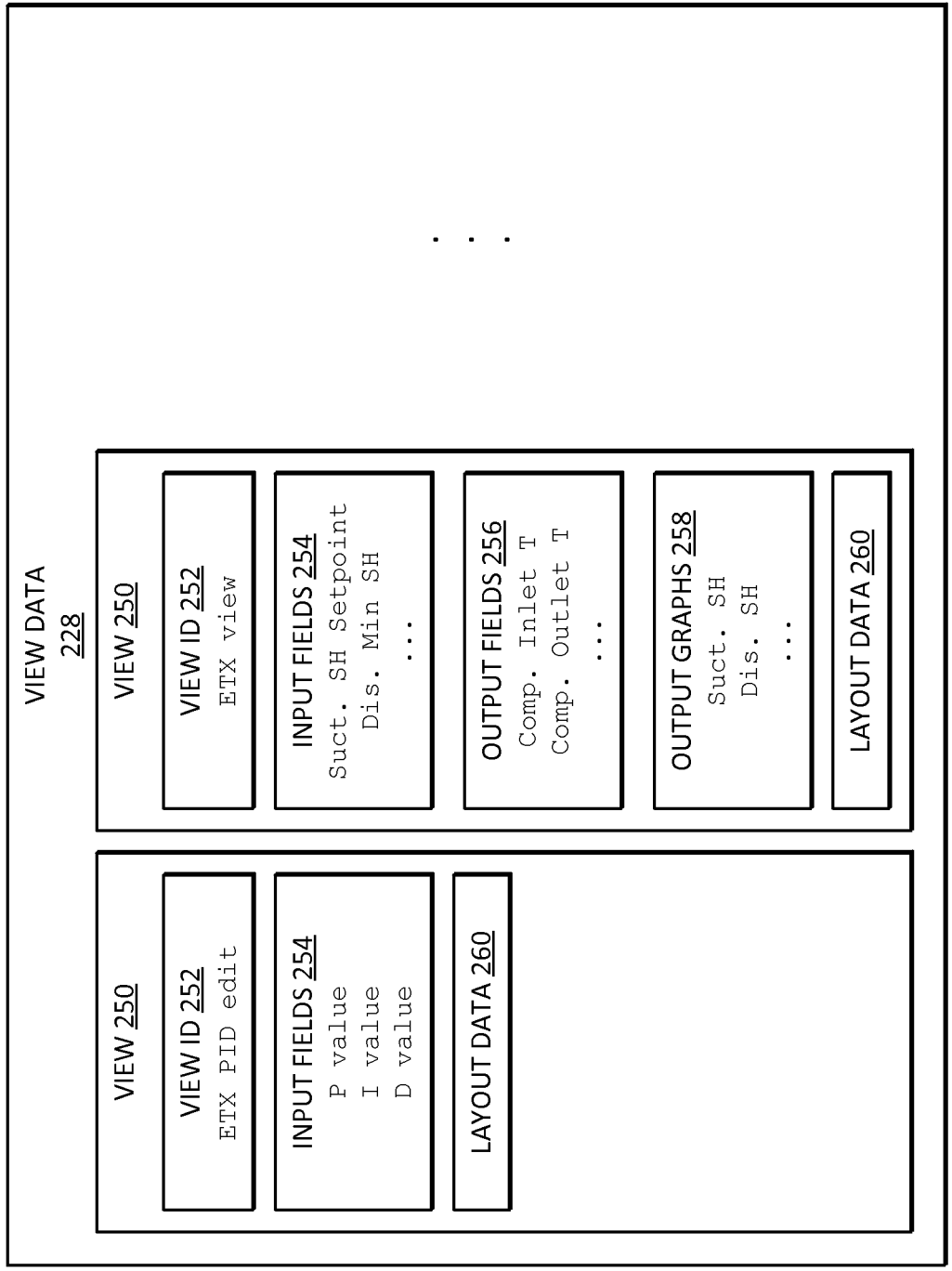
FIG. 11 is a diagram of view data according to some embodiments.

FIG. 11 shows examples of view data 228 according to some embodiments.

One or more view data sets 250 includes data records for view unique identifier or view name 252 and data records for one or more of input fields 254, output fields 256, and output graphs 258. Data records for input fields 254, output fields 256, and output graphs 258 include linking information that links each data element of such data record with an element of control data 212, so that, for example, an input field for a set point stores an inputted value in memory 204 for access to any of the control loops 214.

Each view data set 250 further includes layout information 260 indicative of locations on the touchscreen 220 at which to position the specified input fields 254, output fields 256, and output graphs 258. Layout information 260 can include screen coordinates and sizes for such.

Figure 12:
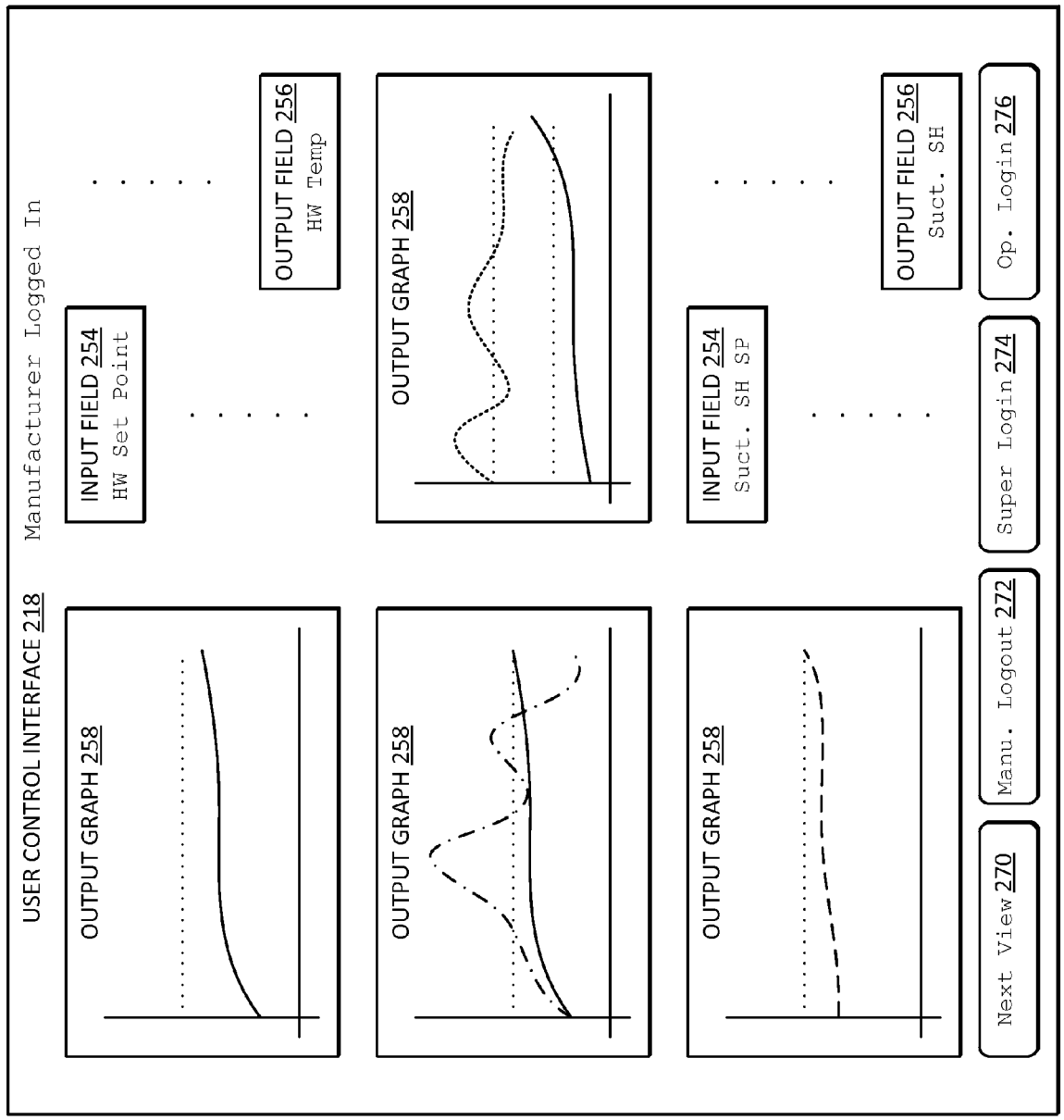
FIG. 12 is a diagram of the user control interface according to some embodiments.

FIG. 12 shows the user control interface 218 according to some embodiments.

The user control interface 218 includes input fields 254, output fields 256, and output graphs 258 laid out according to the layout data 260 of the currently selected view.

In the example shown, a user of type "Manufacturer" is logged in. Accordingly, in this view the input fields 254, output fields 256, and output graphs 258 include a compressor capacity graph, a hot water set point input field, a hot water temperature output field, input fields for control loop (PID) parameters for the water-heating control loop and compressor back-off control loop, a compressor suction superheat graph, a compressor discharge superheat graph, a compressor suction pressure graph, input fields for control loop (PID) parameters for the suction superheat control loop, input fields for control loop (PID) parameters for the suction pressure control loop, input fields for control loop (PID) parameters for the discharge superheat control loop, an input field for suction superheat set point, an input field for minimum discharge superheat temperature, an input field for maximum suction pressure, and output fields for the errors of the control loops.

The user control interface 218 further includes a virtual button 270 or other input element to advance to the next view, if any, for the logged in user type, and virtual buttons 272, 274, 276 or other input elements to log out the current user type and to log in as another user type.

Figure 13:
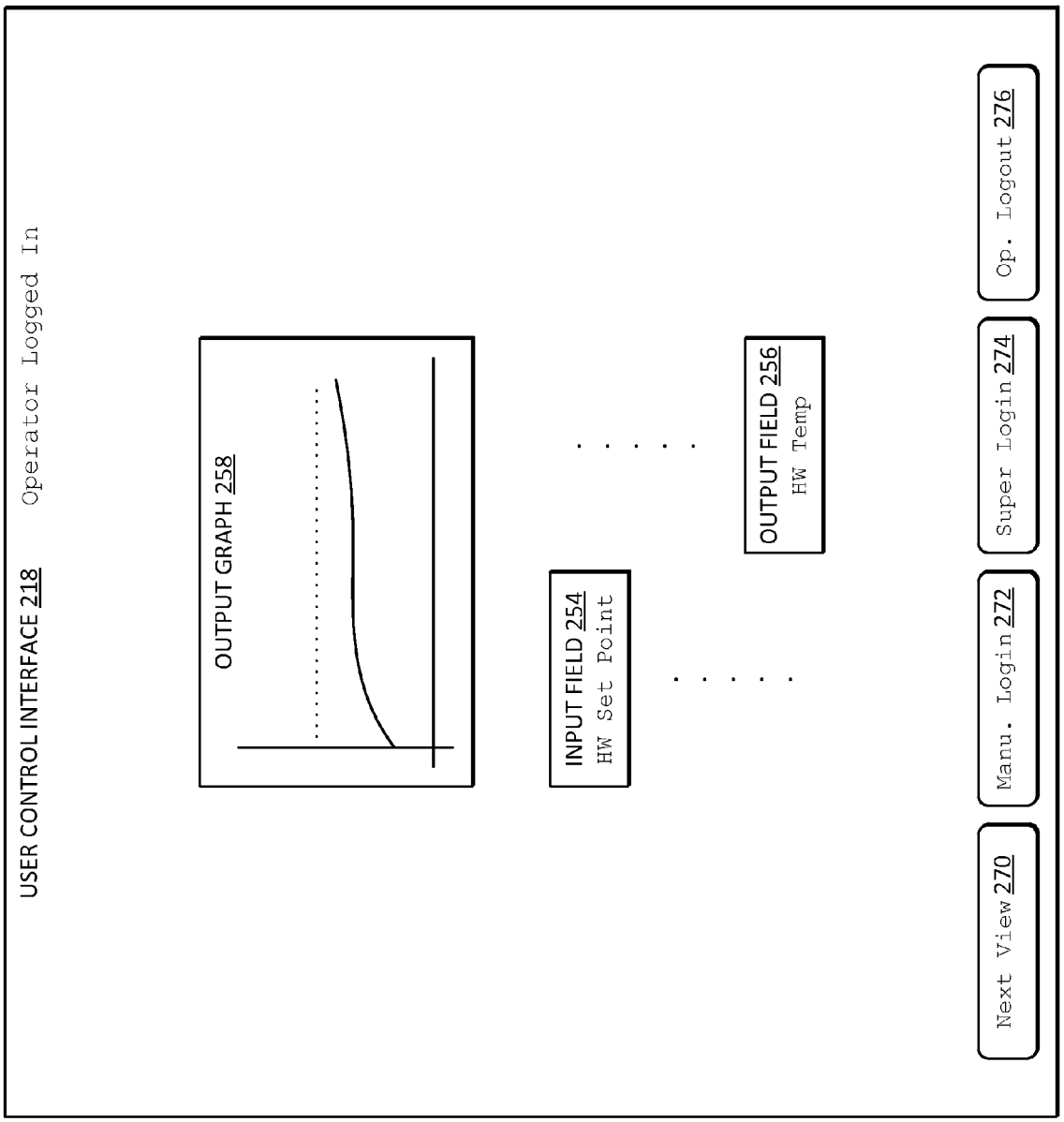

FIG. 13 shows the user control interface 218 showing a different user type, for example an "Operator", logged in. Only the information of the views permitted by the permissions database 226 is shown. In the example view shown, the "Operator" user type is only allowed to view a graph 258 for compressor capacity, an input field 254 for hot water set point, and an output field 256 for hot water temperature. This can advantageously prevent an operator who is not skilled in the engineering underlying the system from damaging the system or property around the system, or potentially harming themself or people nearby.

Figure 14:
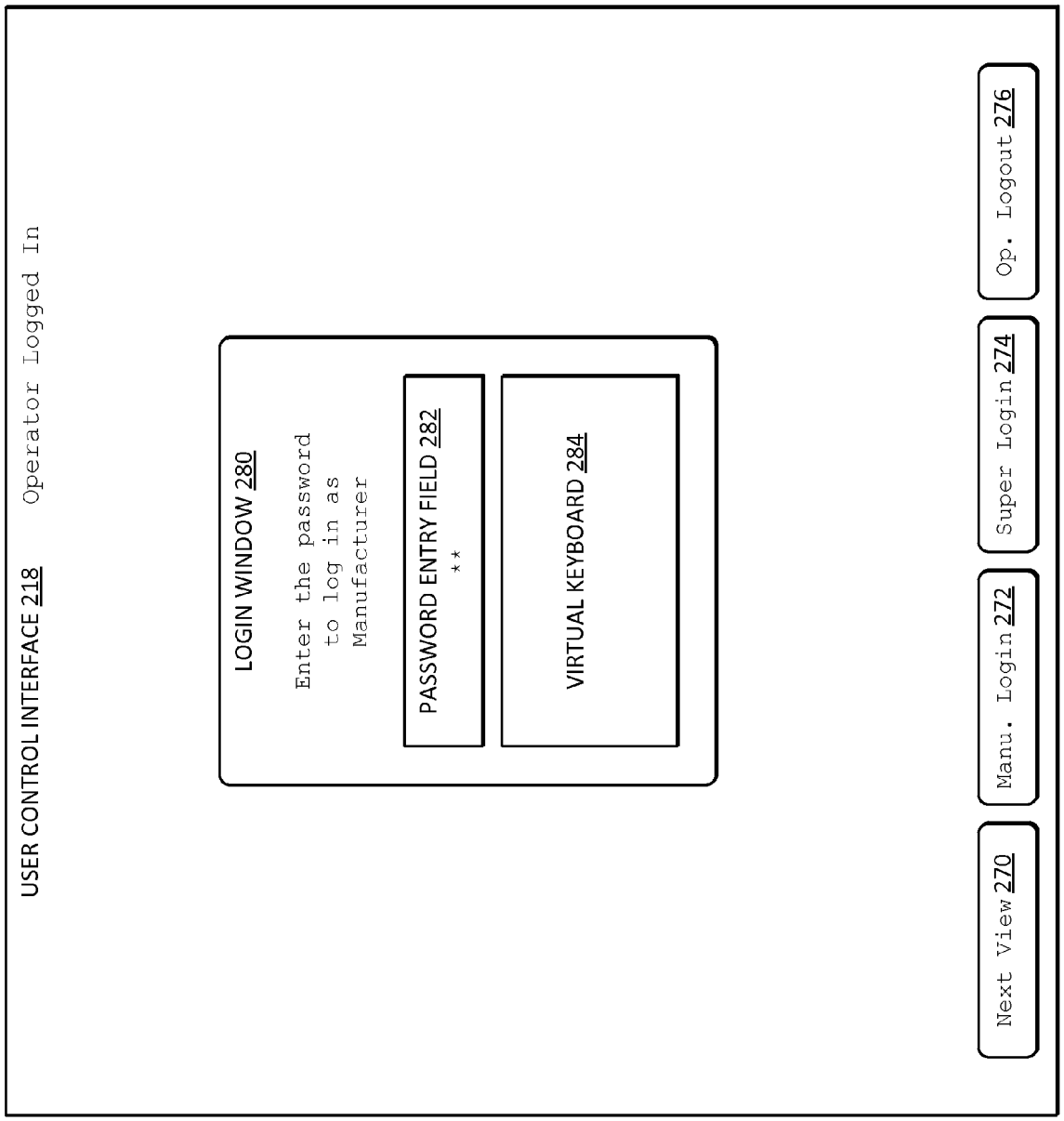
FIG. 14 is a diagram of a log in window.

FIG. 14 shows that after a user taps one of the buttons 272, 274, 276 to log in as another user type, the user control interface 218 displays a login window 280 displaying an instructional message, a password entry field 282, and a virtual keyboard 284. If the password is correctly entered, the user control interface 218 displays the initial view for the newly logged in user type. If the password is not correctly entered, the user control interface 218 displays the previous view.

As can be seen from the above, the user control interface can provide for permission-based and password-protected control of a heat transfer system, in that at least one type of user is permitted to input control loop parameters and other type of user is prevented from inputting such parameters. Further, the views data structure can allow for customization of different views for different types of users, all of whom may not require the same level of access. This can prevent a heat transfer system from causing harm or damage, while still allowing it to remain adaptable to different conditions. These advantages are particularly evident in waste-heat recovery systems used to heat water for residential or hotel use, since skilled operators may not be readily available.

In view of the above, it should be understood that the control techniques and systems described herein are precise, robust, and efficient, and particularly well suited for control of heat transfer systems used for waste heat recovery to heat water for human use in cooking, cleaning, bathing and other activities.

While the foregoing provides certain non-limiting example embodiments, it should be understood that combinations, subsets, and variations of the foregoing are contemplated. The monopoly sought is defined by the claims.

What is claimed is:

1. A heat transfer system comprising:
a compressor for circulating a working fluid, the compressor having an inlet and an outlet, the compressor operable at a controllable operating capacity;
a condenser connected to the outlet of the compressor, the condenser configured to receive flow of water to be heated;
an electrically controlled valve positioned to receive the working fluid from the outlet of the condenser;
an evaporator connected between an outlet of the electrically controlled valve and the inlet of the compressor, the evaporator configured to receive flow of waste-heat bearing fluid;
pressure and temperature sensors positioned to measure pressures and temperatures of the heat transfer system; and
a controller connected to the pressure and temperature sensors, the electrically controlled valve, and the compressor, the controller configured to control the heat transfer system according to one or more of compressor suction superheat, compressor discharge superheat, compressor suction pressure, compressor discharge pressure, and water temperature, the controller including a touchscreen configured to display a user control interface configured to display one of a first view, a second view and a third view based on a permissions database defining different types of users,
wherein the different types of users include an operator user type having permission to access the first view, a superintendant user type having permission to access the second view, and a manufacturer user type having permission to access the third view:
the first view including a compressor capacity graph, a hot water temperature output field to display a current hot water temperature, and a hot water input field to adjust a hot water set point;
the second view including the compressor capacity graph, a compressor suction superheat graph, a compressor discharge superheat graph, the hot water temperature output field, a compressor inlet temperature output field, a compressor outlet temperature output field, and a first plurality input fields to adjust the hot water set point, a suction superheat setpoint, a minimum discharge superheat temperature, and a maximum suction pressure; and
the third view including the compressor capacity graph, the compressor suction superheat graph, the compressor discharge superheat graph, the hot water temperature output field, the compressor inlet temperature output field, the compressor outlet temperature output field, error code output fields, and a second plurality input fields to adjust the hot water set point, the suction superheat setpoint, the minimum discharge superheat temperature, the maximum suction pressure, and a plurality of control loop parameters (PID) to control a suction superheat control loop, a discharge superheat control loop, and a suction pressure control loop.

2. The system of claim 1, wherein the controller is configured to require password protected login for at least one of the different types of users.

3. The system of claim 1, wherein the permissions database permits input of control loop parameters by the manufacturer user type and prevents input of control loop parameters by the superintendant user type and the operator user type.

4. The system of claim 1, wherein the controller is configured to control the heat transfer system according to all of compressor suction superheat, compressor discharge superheat, compressor suction pressure, compressor discharge pressure, and water temperature.

5. The system of claim 1, wherein the operator user type has permission to adjust the hot water set point.

6. The system of claim 1, wherein the superintendent user type has permission to adjust the hot water set point, the suction superheat setpoint, the minimum discharge superheat temperature, and the maximum suction pressure.

7. The system of claim 1, wherein the manufacturer user type has permission to adjust the hot water set point, the suction superheat setpoint, the minimum discharge superheat temperature, the maximum suction pressure, and the plurality of control loop parameters (PID) to control the suction superheat control loop, the discharge superheat control loop, and the suction pressure control loop.

8. A method of controlling a heat transfer system, the method comprising:
controlling a compressor and an electrically controlled valve for circulating a working fluid according to one or more of compressor suction superheat, compressor discharge superheat, compressor suction pressure, compressor discharge pressure, and temperature of water received at a condenser to be heated by waste-heat bearing fluid in an evaporator; and
displaying on a touchscreen a user control interface configured to display one of a first view, a second view and a third view based on a permissions database defining different types of users,
wherein the different types of users include an operator user type having permission to access the first view, a superintendant user type having permission to access the second view, and a manufacturer user type having permission to access the third view:
the first view including a compressor capacity graph, a hot water temperature output field to display a current hot water temperature, and a hot water input field to adjust a hot water set point;
the second view including the compressor capacity graph, a compressor suction superheat graph, a compressor discharge superheat graph, the hot water temperature output field, a compressor inlet temperature output field, a compressor outlet temperature output field, and a first plurality input fields to adjust the hot water set point, a suction superheat setpoint, a minimum discharge superheat temperature, and a maximum suction pressure; and
the third view including the compressor capacity graph, the compressor suction superheat graph, the compressor discharge superheat graph, the hot water temperature output field, the compressor inlet temperature output field, the compressor outlet temperature output field, error code output fields, and a second plurality input fields to adjust the hot water set point, the suction superheat setpoint, the minimum discharge superheat temperature, the maximum suction pressure, and a plurality of control loop parameters (PID) to control a suction superheat control loop, a discharge superheat control loop, and a suction pressure control loop.

9. The method of claim 8, further comprising requiring password protected login for at least one of the different types of users.

10. The method of claim 8, wherein the permissions database permits input of control loop parameters by the manufacturer user type and prevents input of control loop parameters by the superintendant user type and the operator user type.

11. The method of claim 8, comprising controlling the heat transfer system according to all of compressor suction superheat, compressor discharge superheat, compressor suction pressure, compressor discharge pressure, and temperature of the water.

12. The method of claim 8, wherein the operator user type has permission to adjust the hot water set point.

13. The method of claim 8, wherein the superintendent user type has permission to adjust the hot water set point, the suction superheat setpoint, the minimum discharge superheat temperature, and the maximum suction pressure.

14. The method of claim 8, wherein the manufacturer user type has permission to adjust the hot water set point, the suction superheat setpoint, the minimum discharge superheat temperature, the maximum suction pressure, and the plurality of control loop parameters (PID) to control the suction superheat control loop, the discharge superheat control loop, and the suction pressure control loop.

* * * * *